US012720516B2

(12) United States Patent
Goldstein et al.

(10) Patent No.: US 12,720,516 B2
(45) Date of Patent: Aug. 25, 2026

(54) MITIGATION OF UPLINK DOPPLER SHIFT IN WIRELESS COMMUNICATIONS

(71) Applicant: Dell Products L.P., Round Rock, TX (US)

(72) Inventors: Eran Goldstein, Montreal (CA); Mohammed Abdelsadek, Kanata (CA); Jayaram Venguduswamy Srinivasan, Nepean (CA)

(73) Assignee: Dell Products L.P., Round Rock, TX (US)

( * ) Notice: Subject to any disclaimer, the term of this patent is extended or adjusted under 35 U.S.C. 154(b) by 291 days.

(21) Appl. No.: 18/637,197

(22) Filed: Apr. 16, 2024

(65) Prior Publication Data

US 2025/0324405 A1 Oct. 16, 2025

(51) Int. Cl.
*H04W 72/0453* (2023.01)

(52) U.S. Cl.
CPC ............................... *H04W 72/0453* (2013.01)

(58) Field of Classification Search
CPC .... H04W 72/0453; H04W 24/10; H04B 7/01; H04L 5/0051
See application file for complete search history.

(56) References Cited

U.S. PATENT DOCUMENTS

2009/0318090 A1* 12/2009 Flordelis ............. H04L 25/0224 455/226.2
2010/0279638 A1* 11/2010 Lindoff ................ H04B 17/382 455/226.1
2025/0324480 A1* 10/2025 Farag .................... H04W 76/20

OTHER PUBLICATIONS

Wang, et al., "Performance degradation of OFDM systems due to Doppler spreading," in IEEE Transactions on Wireless Communications, vol. 5, No. 6, pp. 1422-1432, Jun. 2006, doi: 10.1109/TWC. 2006. 1638663. 11 p.

Lin, et al., "Doppler Shift Estimation in 5G New Radio Non-Terrestrial Networks," 2021 IEEE Global Communications Conference (GLOBECOM), Madrid, Spain, Aug. 17, 2021, pp. 1-6, doi: 10.1109/GLOBECOM46510.2021.9685184. 6 p.

* cited by examiner

*Primary Examiner* — Sulaiman Nooristany
(74) *Attorney, Agent, or Firm* — Amin, Turocy & Watson, LLP

(57) ABSTRACT

The technology described herein is directed towards mitigating the uplink Doppler shift experienced at a base station by estimating the uplink Doppler effect at the user equipment (UE) side, and modifying the user equipment's transmission based on the estimated uplink Doppler shift. A UE obtains downlink frequencies, including a downlink carrier frequency of a cell of interest, and frequencies from neighbor cells/different beams of a cell. The UE determines an estimated downlink frequency value based on at least two of the obtained downlink frequency values, and synchronizes to the cell of interest using the estimated downlink frequency value. A Doppler shift coefficient is determined based on a difference between the downlink carrier frequency and the estimated downlink frequency value. Based on the Doppler shift coefficient, the UE modifies the uplink carrier frequency; uplink carrier modification can be by direct shift of the uplink frequency or digital manipulation.

20 Claims, 11 Drawing Sheets begin

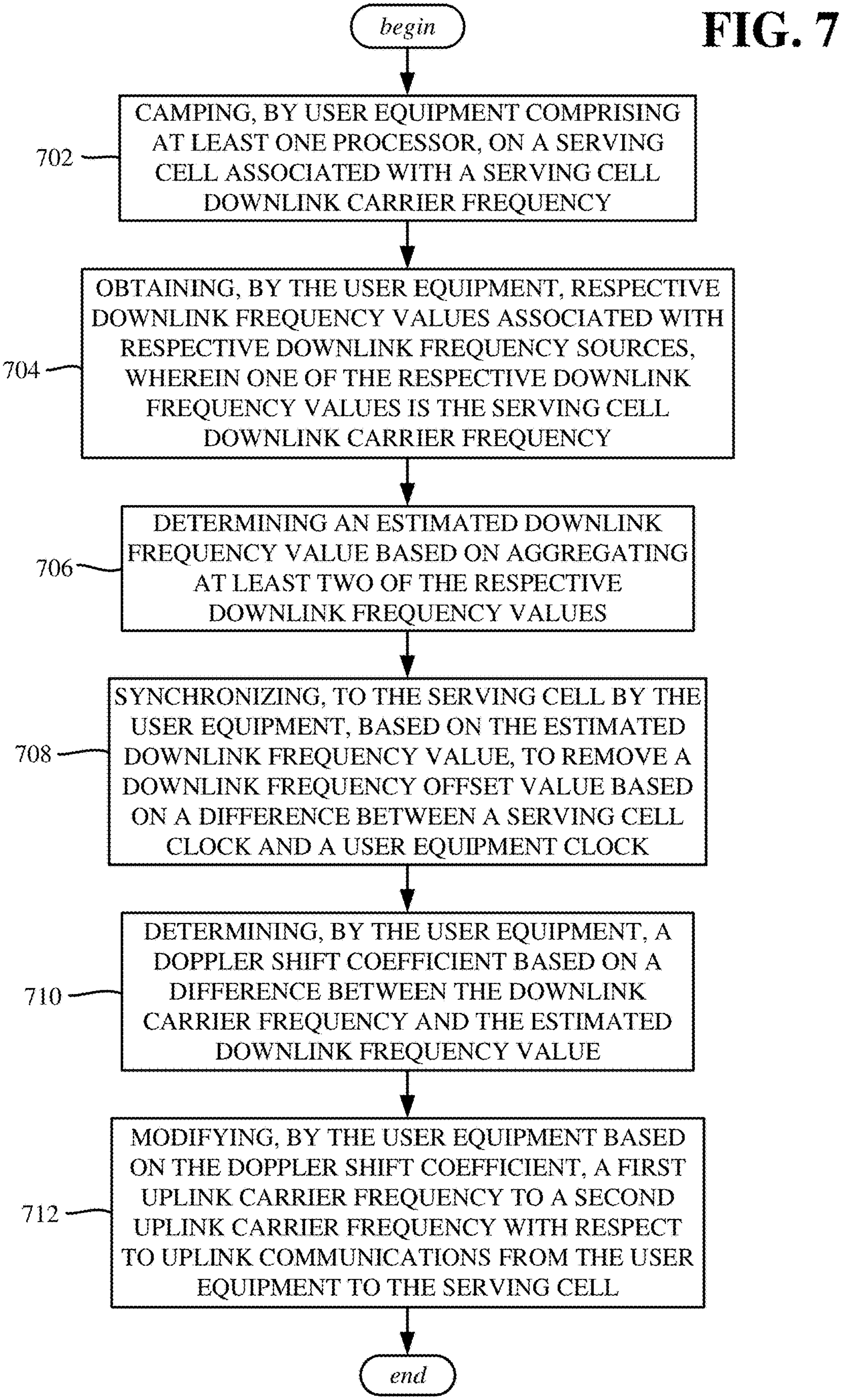

FIG. 7
702
CAMPING, BY USER EQUIPMENT COMPRISING AT LEAST ONE PROCESSOR, ON A SERVING CELL ASSOCIATED WITH A SERVING CELL DOWNLINK CARRIER FREQUENCY
704
OBTAINING, BY THE USER EQUIPMENT, RESPECTIVE DOWNLINK FREQUENCY VALUES ASSOCIATED WITH RESPECTIVE DOWNLINK FREQUENCY SOURCES, WHEREIN ONE OF THE RESPECTIVE DOWNLINK FREQUENCY VALUES IS THE SERVING CELL DOWNLINK CARRIER FREQUENCY
706
DETERMINING AN ESTIMATED DOWNLINK FREQUENCY VALUE BASED ON AGGREGATING AT LEAST TWO OF THE RESPECTIVE DOWNLINK FREQUENCY VALUES
708
SYNCHRONIZING, TO THE SERVING CELL BY THE USER EQUIPMENT, BASED ON THE ESTIMATED DOWNLINK FREQUENCY VALUE, TO REMOVE A DOWNLINK FREQUENCY OFFSET VALUE BASED ON A DIFFERENCE BETWEEN A SERVING CELL CLOCK AND A USER EQUIPMENT CLOCK
710
DETERMINING, BY THE USER EQUIPMENT, A DOPPLER SHIFT COEFFICIENT BASED ON A DIFFERENCE BETWEEN THE DOWNLINK CARRIER FREQUENCY AND THE ESTIMATED DOWNLINK FREQUENCY VALUE
712
MODIFYING, BY THE USER EQUIPMENT BASED ON THE DOPPLER SHIFT COEFFICIENT, A FIRST UPLINK CARRIER FREQUENCY TO A SECOND UPLINK CARRIER FREQUENCY WITH RESPECT TO UPLINK COMMUNICATIONS FROM THE USER EQUIPMENT TO THE SERVING CELL
end

900

MOBILE HANDSET

APPLICATIONS 906

CLIENT (STORE, DISCOVERY, PLAY) 946

TRIGGER COMPONENT 938

HYSTERESIS COMPONENT 936

SIP CLIENT 940

FIRMWARE 908

VIDEO COMP 930

DISPLAY 912

CAMERA 922

SERIAL I/O INTERFACE 914

USER INPUT 935

SUBSCRIBER IDENTITY SYSTEM 918 920

COMMUNICATION COMPONENT 910

CELL TCVR 911

WIFI TCVR 913

PROCESSOR 902

MEMORY 904

LOCATION COMPONENT 932

AUDIO I/O 916

POWER SOURCE 924

POWER I/O 926

MITIGATION OF UPLINK DOPPLER SHIFT IN WIRELESS COMMUNICATIONS

BACKGROUND

In wireless radio communications, user equipment (UEs) traveling at high-speed relative to the network's base station experience high Doppler shifts in the received and transmitted signals. Uplink signals with considerable Doppler shifts can result in intercarrier interference (ICI) and consequently reduce the overall cell throughput.

BRIEF DESCRIPTION OF THE DRAWINGS

The technology described herein is illustrated by way of example and not limited in the accompanying figures in which like reference numerals indicate similar elements and in which:

FIG. 7 is a flow diagram showing example operations related to determining a Doppler shift coefficient by a user equipment for modifying the user equipment's uplink carrier frequency, in accordance with various implementations and embodiments of the subject disclosure.

DETAILED DESCRIPTION

Figure 1:
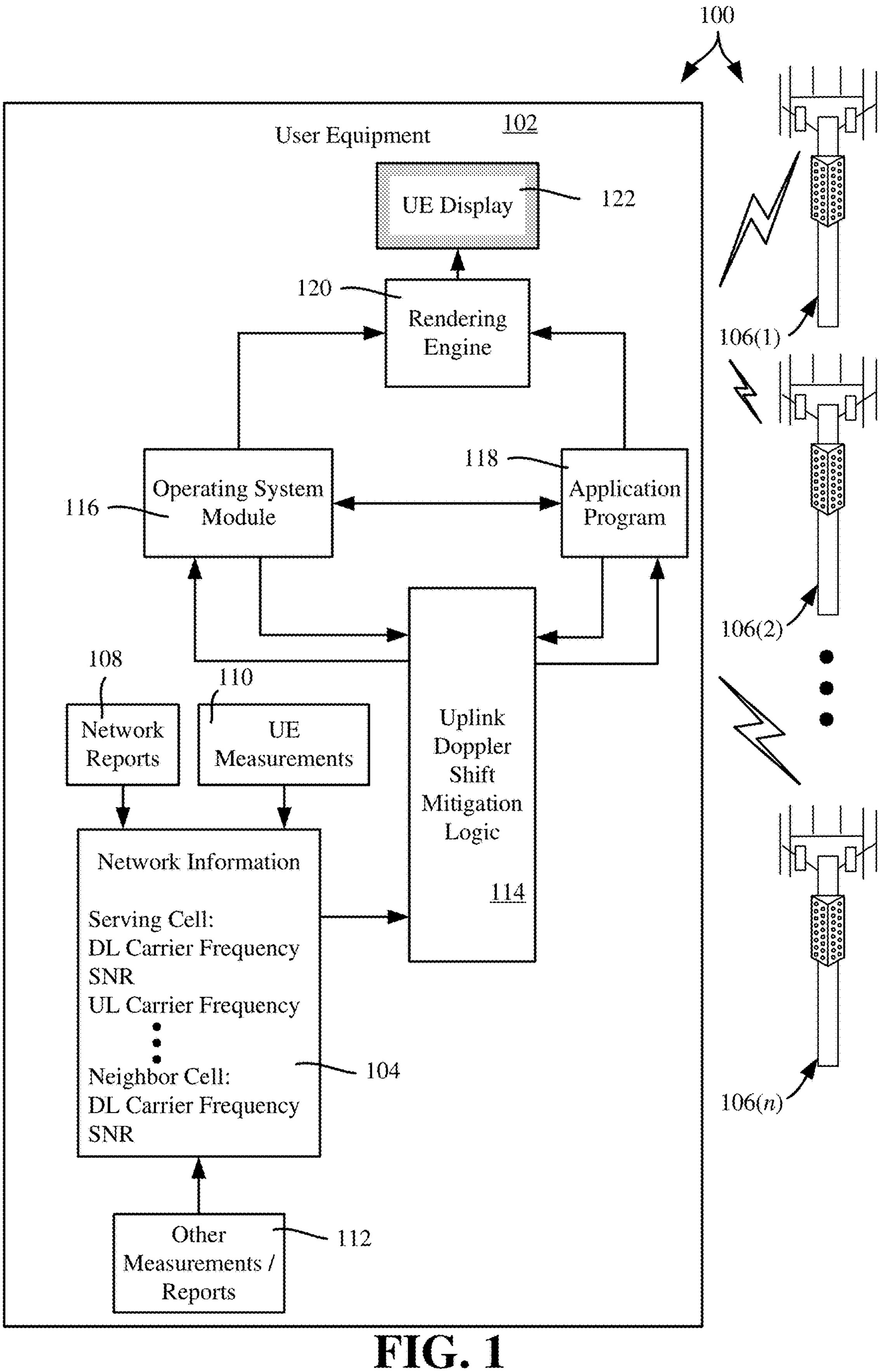
FIG. 1 is a block diagram representation of an example user equipment configured with uplink Doppler mitigation logic, in accordance with various implementations and embodiments of the subject disclosure.

Various implementations and embodiments of the technology described herein are generally directed towards reducing the uplink Doppler effect experienced at a base station by estimating the uplink Doppler effect at the user equipment (UE) side, and adjusting the user equipment's uplink radio frequency (RF) transmission accordingly. To this end, a UE estimates the observed downlink Doppler shift by measuring downlink frequencies of neighbor cells' reference signals, and along with the downlink carrier frequency of a serving cell, determines the Doppler shift based the downlink frequencies. The UE "pre-shifts" the uplink signal to compensate for (e.g., subtract) the Doppler shift that the connected cell otherwise would experience.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimization," "optimize" or "optimal" and the like (e.g., "maximize," "minimize" and so on) only represent objectives to move towards a more optimal state, rather than necessarily obtaining ideal results.

Moreover, terms such as "user equipment," "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

The subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example system 100, in which a user equipment (UE) 102 obtains network information 104, via the network with which the UE 100 is communicating. The system includes one or more cells **106(1)-106(*n*) with which the UE 102 can communicate, including a serving cell (e.g., the cell 106(1), and one or more neighbor cells, e.g., 106(2)-106(*n*). In general, the network information 104 is obtained by network reports 108, UE measurements 110 and/or other measurements/reports 112, such as data download/upload rates which can be measured based on recent data communications and/or obtained via third party program(s). The network information 104 can be obtained as a whole or in appropriate parts thereof on demand and/or on some relatively frequent basis so as to be current or generally current in time. As shown in FIG. 1, the network information 104 can include the serving cell's downlink (DL) carrier frequency, signal-to-noise ratio (SNR), and the uplink (UL) carrier frequency, along with similar DL and SNR information for the neighbor cells 106(2)-106(*n*)**.

In the example of FIG. 1, the network information 104 is accessed by uplink Doppler shift mitigation logic 114. Any of this network information 104 can be made available in a suitable format to a requesting program, e.g., via an interface or the like to the uplink Doppler shift mitigation logic 114 (or to a container of the network condition information 104), such as called by an operating system module 116 or an application program 118. As one example, the operating system module 112 can request some portion of the network information 104, such as the serving cell's downlink carrier frequency data, to be returned. The requested information 104 that is returned can be numeric values (e.g., the current value as is) or transformed in some way, such as an index mapped to the current value. As another example, an application program 118 can be used to detect the speed of the user equipment (e.g., via GPS) and notify the uplink Doppler shift mitigation logic 114 to start operating once a certain high speed is reached, and stop operating once a certain low speed is reached.

FIG. 1 also shows a rendering engine 120 coupled to a UE display 122. In general, the rendering engine 120 outputs to the display 122 based on information from the operating system module 116 and any application program 118 that is running in the foreground.

Figure 2A:
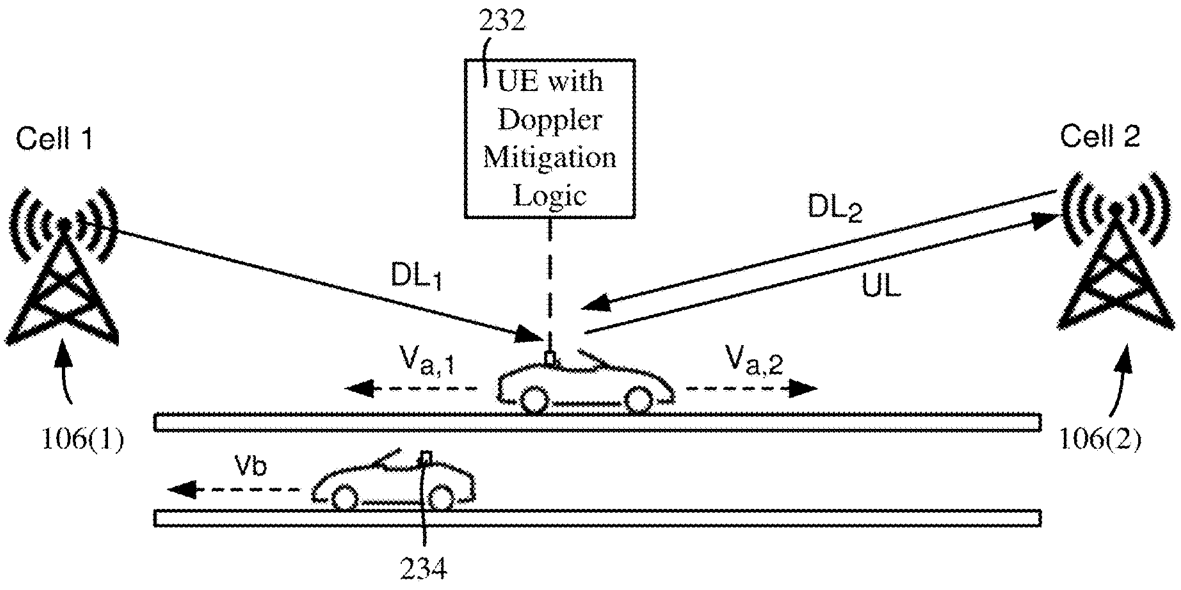
FIGS. 2A and 2B are example representations of mobile user equipment experiencing Doppler shifts relative to multiple different cells, in accordance with various implementations and embodiments of the subject disclosure.

FIG. 2A shows user equipment (UEs) 232 and 234 traveling at high-speed relative to the network's base stations Cell 1 106(1), and Cell 2 106(2). The UEs 232 and 234 thus experience high Doppler shifts in their received and transmitted signals. Each UE can have a different speed, e.g., $v_{a,1}=-v_{a,2}\neq v_b$, whereby the base stations 106(1) and 106(2) experience a different Doppler shift per UE at their respective locations. Although the UEs are expected to synchronize to the downlink (DL) radio frequency (RF) utilizing the synchronization channels (e.g., the synchronization signal block (SSB) in 5G and the primary/secondary synchronization signal (PSS/SSS) in 4G), the base station is not expected to change its receiver frequency as an attempt to synchronize to the UEs' uplink transmissions.

Uplink signals with considerable Doppler shifts can result in intercarrier interference (ICI), and consequently reduce the overall cell throughput. Base stations can accommodate for this by keeping a gap frequency between the allocation of different UEs. However, this reduces the bandwidth utilization, and does not solve the intra-UEs signal intercarrier interference issues.

Note that while UEs generally correct their downlink Doppler shifts, (and the technology described herein does not change the way the UE handles such downlink transmissions), this is not the case for the uplink Doppler shifts. Although a secondary transmission of a secondary synchronization signal at a different frequency would allow a UE to estimate and correct its uplink signals, extra bandwidth would have to be dedicated to such a secondary synchronization signal, reducing spectral efficiency, and the secondary synchronization signal block would have to be located at a far frequency, which would need a different set of RF components (e.g., power amplifier and filters) and possibly a different antenna, or very wideband components. Instead, the technology described herein is directed towards adjusting a UE's uplink transmissions to compensate for the Doppler shift based on measuring downlink signals received from different sources (different cells and/or different beams of a cell), and using the measured downlink signal data to determine the Doppler shift, without needing base station actions or secondary synchronization signaling.

Figure 3:
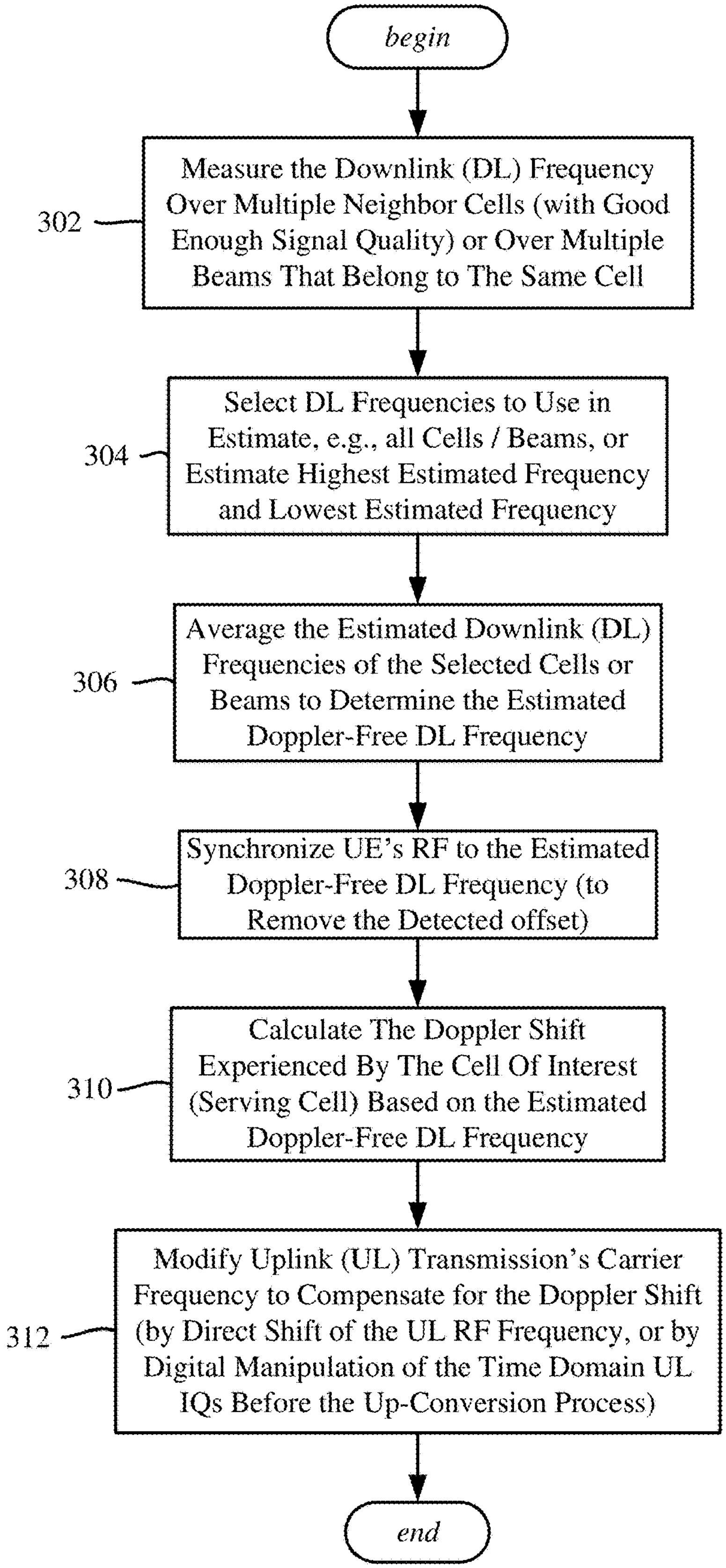
FIG. 3 is a flow diagram showing example operations related to measuring/obtaining downlink frequencies of multiple cells/beams and using those frequencies to compensate for uplink Doppler shift, in accordance with various implementations and embodiments of the subject disclosure.

Example main operations for uplink Doppler shift mitigation by modifying the uplink transmission's carrier frequency based on downlink signal measurements are summarized in FIG. 3. Operation 302 represents the UE measuring the downlink frequency over multiple neighbor cells (e.g., those with good enough signal quality) or over multiple beams that belong to the same cell. Note that the UE already knows and has locked onto the downlink frequency of its serving cell. The network may aid the UE in selecting which cells/beams to use to measure the DL frequencies, however, this step is not mandatory. In other words, the network may guide the UE by transmitting a common configuration to the UE requesting or disabling certain features, and limiting the neighbor cells from which the UE can select to perform the estimation of the Doppler-free DL frequency as described at operation 306.

Operation 304 represents selecting which downlink frequencies to use. This may be all frequencies available, or a subgroup of all available frequencies that have "good" associated signal-to-noise ratios with respect to a threshold SNR.

Operation 306 represents the UE using a specific function to average the estimated DL frequencies of the different cells or beams, e.g., all, a subgroup less than all, or an average of the minimum and maximum estimated Doppler-free DL frequency DL frequencies. Thus, a Doppler-free DL frequency is estimated using one or the other averaging technique, and the UE synchronizes with the serving cell using the Doppler-free DL frequency (operation 308).

Operation 310 represents the UE utilizing the estimated Doppler-free DL frequency to calculate the Doppler shift being experienced by the cell of interest, e.g., the serving cell. Operation 312 represents the UE updating its UL transmission's carrier frequency to compensate for the Doppler shift of the cell of interest. There are two options to perform this update modification described herein, namely direct shift of the UL RF frequency, or digital manipulation of the time domain UL IQs before the up-conversion process; (where in IQ, I represents in-phase signal amplitude and Q represents quadrature signal amplitude).

It should be noted that the Doppler shift mitigation operations of FIG. 3 significantly improve the average Doppler shift experienced by the cell in direct line-of-sight situations. However, Doppler shift mitigation based on the technology described herein is applicable to and beneficial in many or all other scenarios.

Figure 2B:
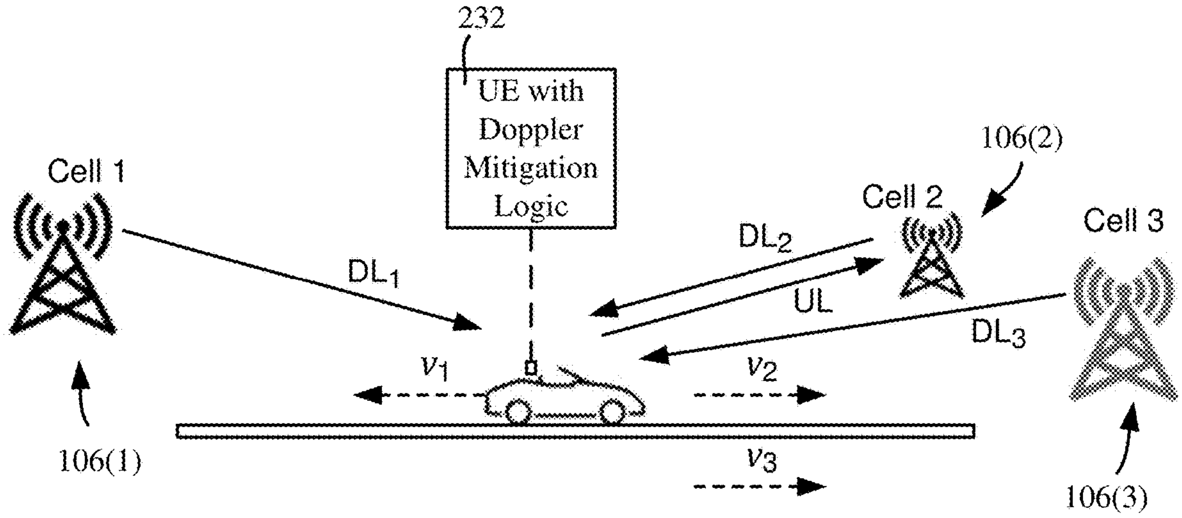

The technology described herein estimates the DL observed Doppler shift using neighbor cells' reference signals, and "pre-shifts" the UL signal to subtract the Doppler shift that the connected cell would otherwise experience. In general, there are two major sources of the UE's frequency offset over the DL transmissions, namely the RF frequency error due to the internal clock frequency offset, which is denoted as Δf, and the Doppler frequency shift due to the relative speed $v_n$ towards a base station n, as generally represented in FIG. 2B.

The first clock offset-based contributor, can be further split into the UE's offset and the cell's offset as in equation (1):

$$\Delta f = \Delta f_{UE} + \Delta f_{cell}. \tag{1}$$

In 3GPP, the cells are required to have considerably more accurate clocks absolutely and relatively (compared to their neighbors). Moreover, in practice, cells often considerably exceed the 3GPP requirements. Therefore, the UE's contribution is the dominant part, as in equation (2):

$$\Delta f = \Delta f_{UE} + \Delta f_{cell} \cong \Delta f_{UE}. \tag{2}$$

Accordingly, the estimated DL frequency of a base station n, $F_{DL\_est,n}$, can be given as in equation (3):

$$F_{DL\_est,n} = f_c + \Delta f + \frac{v_n * f_c}{c}, \tag{3}$$

where $f_c$ is the RF carrier frequency and c is the speed of light.

As can be seen, because both frequency offset sources Δf and the $v_n$ component of $$\frac{v_n * f_c}{c}$$

are unknown to the UE, the UE cannot estimate the unknown Doppler coefficient, $v_n$. However, described herein is a technology for estimating the Doppler coefficient $v_n$.

Figure 4:
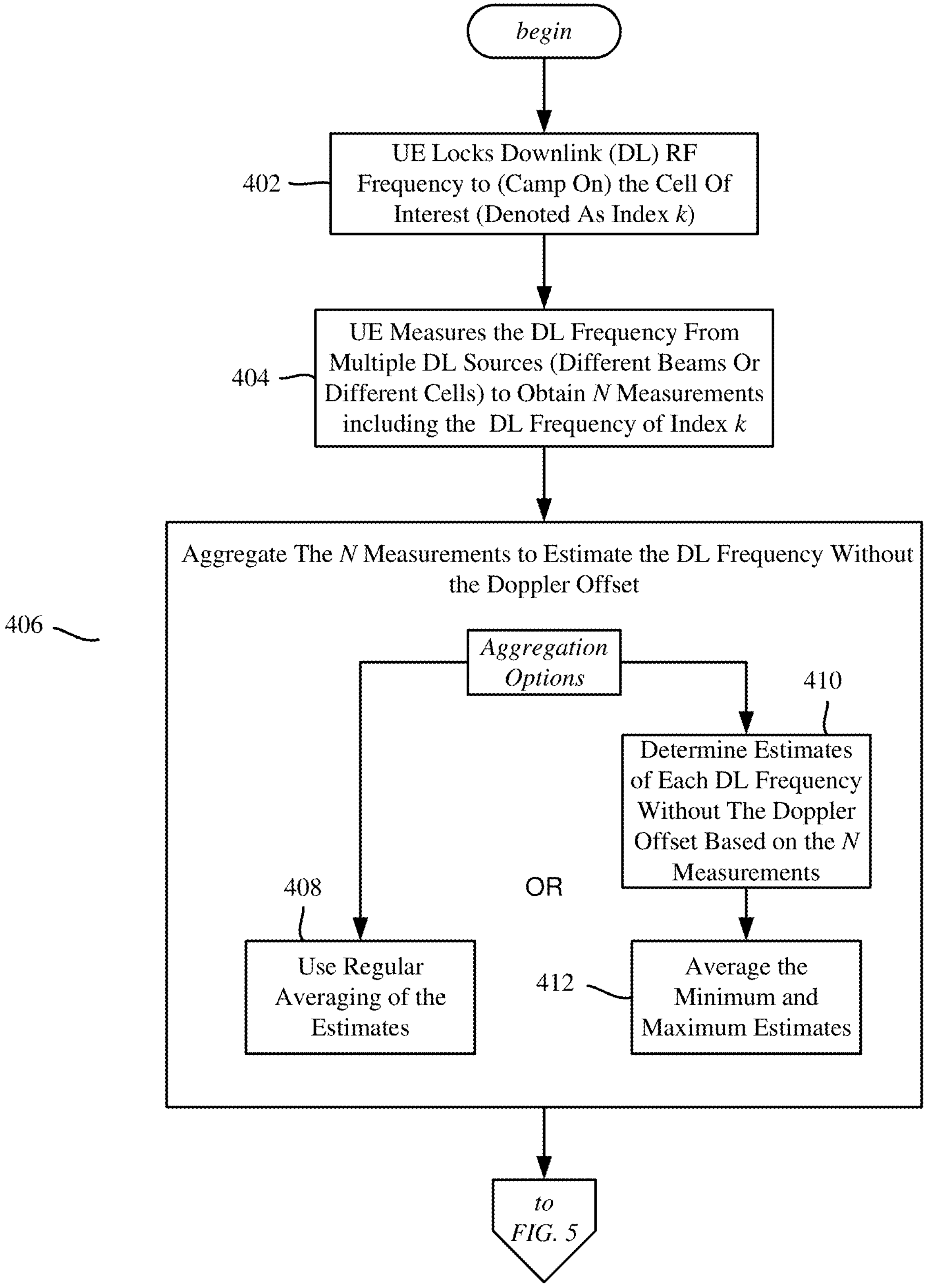
FIGS. 4 and 5 comprise a flow diagram showing example operations related to logic that mitigates uplink Doppler shift, in accordance with various implementations and embodiments of the subject disclosure.
Figure 5:
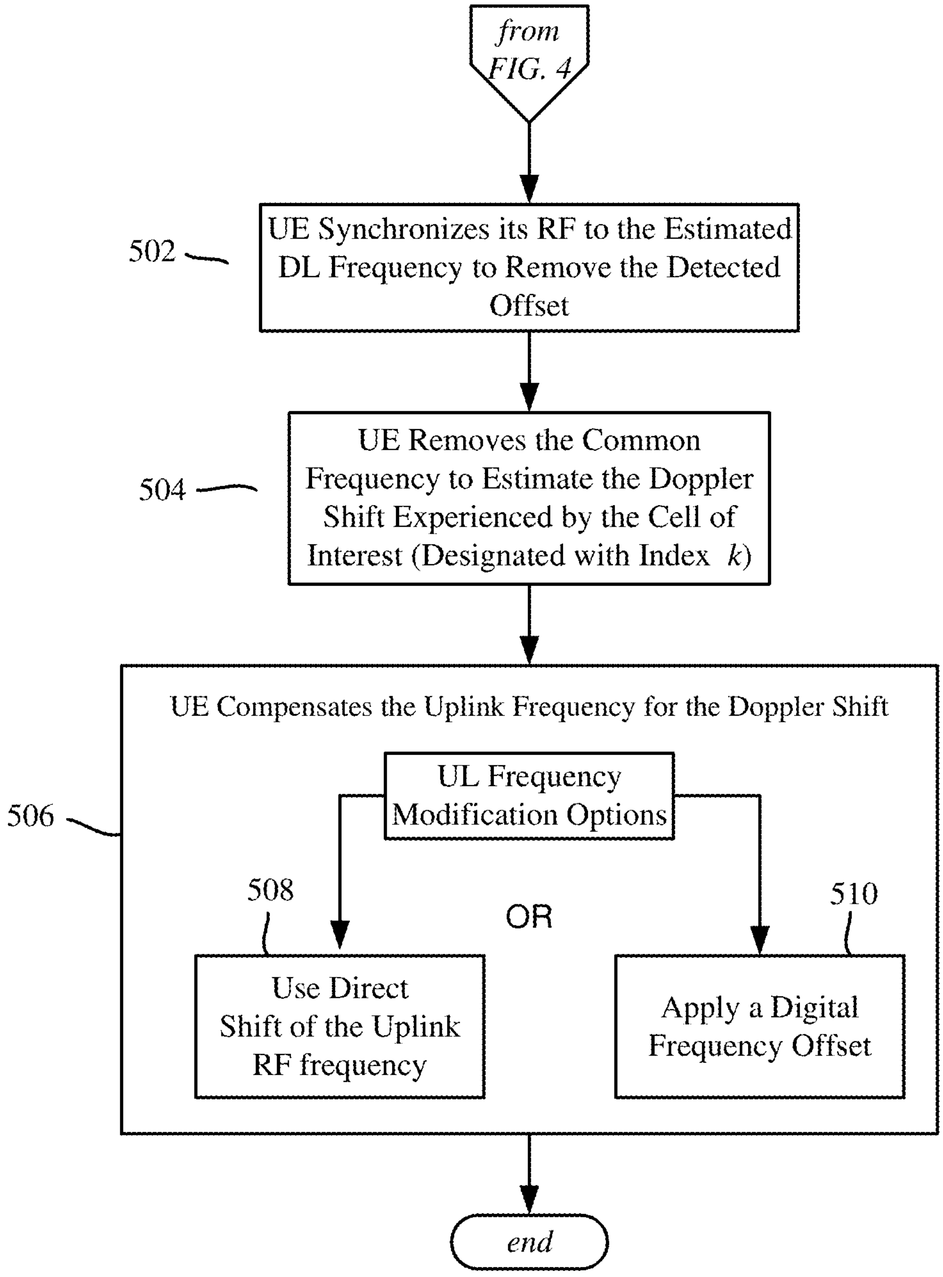

FIGS. 4 and 5 provide additional details with respect to the operations of the uplink Doppler shift mitigation logic 114 (FIG. 1). At operation 402, the UE locks its DL RF frequency to camp on the cell of interest (denoted as index k), as shown in Equation (1). This is the normal practice implemented today by a cellular UE. At operation 404, the UE measures the DL frequency from multiple DL sources (different beams or different cells), that is, repeating Equation (1) for multiple indexes 1, . . . , n.

Operation 406 represents the UE logic aggregating those N measurements (N=a selected group of at least two of the measured source DL frequencies from the set 1, . . . , n and the index k). The UE can aggregate the obtained frequency data to estimate the Doppler-free DL frequency (i.e., without the Doppler offset), $$F^*_{DL\_est},$$

using one of the following two (or possibly other) non-limiting example procedures.

A first example procedure is based on using regular averaging, as represented in FIG. 4 by operation 408. This can be done as follows using equations (4-6):

$$F^*_{DL_{est}} = \text{average}_1(F_{DL_{est},n}) = \sum_{n=1}^{N} \frac{F_{DL_{est},n}}{N} \tag{4}$$

$$= f_c + \Delta f_{UE} + \frac{f_c}{c} * \sum_{n=1}^{N} \frac{v_n}{N} \tag{5}$$

$$\cong f_c + \Delta f_{UE}, \tag{6}$$

where the approximation in equation (6) is a result of $$\sum_{n=1}^{N} \frac{v_n}{N} \ll v_k.$$

Referring to FIG. 2B, the UE's estimation of the DL frequency using regular averaging may be less accurate in some situations. In the example shown in FIG. 2B, $v_2=v_3=-v_1=v$. Therefore, for this example the regular average function is (from Equation (4):

$$F^*_{DL_{est}} = \text{average}_1(F_{DL_{est},n}) = f_c + \Delta f_{UE} + \frac{f_c}{c} * \frac{v_1 + v_2 + v_3}{3} \cong f_c + \Delta f_{UE} + \frac{f_c}{c} * \frac{v}{3}. \tag{7}$$

Although the UL frequency estimate is still improved by around 66%, the estimation can be improved as described herein. Indeed, a second example procedure is based on using min-max averaging, which in the example of FIG. 2B (and similar scenarios) provides a more accurate result, as represented in FIG. 4 via operations 410 and 412. Although not explicitly shown in FIG. 4, this can be after selecting only the signals with sufficiently high SNR (i.e., SNR is greater than a defined threshold) such that the estimation is relatively accurate. Once the signals are selected, whether all or only those that meet the SNR threshold, the min-max averaging uses only the highest and lowest frequency estimations as set forth in equation (8):

$$F^*_{DL_{est}} = \text{average}_2 = \frac{\min(F_{DL_{est},n}) + \max(F_{DL_{est},n})}{2} \tag{8}$$

Using min-max averaging for both examples depicted in FIGS. 2A and 2B, results in no bias errors. The procedure/logic continues at operation 502 of FIG. 5.

At operation 502, the UE synchronizes its RF to the estimated DL frequency, and therefore removes the detected (clock difference-based) offset $\Delta f_{UE}$. At operation 504, the UE logic removes the common frequency to estimate the Doppler shift $\hat{f_d}$ experienced by the cell of interest (designated with the index k) as set forth in equation (9):

$$\hat{f_d} = F_{DL\_est,k} - F^*_{DL_{est}} = F_{DL_{est},k} - \text{average}(F_{DL_{est},n}) \cong \frac{v_k * f_c}{c} \tag{9}$$

Once the Doppler shift coefficient is known, operation 506 represents the UE compensating for the Doppler shift using one of the two (non-limiting) example techniques, namely a direct shift of the uplink RF frequency (operation 508), or digital IQs compensation (operation 510). With respect to a direct shift of the uplink RF frequency, the UE manipulates the uplink signal to subtract the frequency offset as set forth in equation (10):

$$F_{UL} = f_c - \hat{f}_d \tag{10}$$

In this way, the connected cell k, which experiences the same Doppler effect as the UE, receives the uplink frequency without offsets as set forth in equation (11):

$$F_{UL} = f_c - \hat{f}_d + \frac{v_k - f_c}{c} \cong f_c \tag{11}$$

With respect to digital IQs compensation, in some scenarios, the UE is not able to have a different offset for downlink and uplink frequencies, e.g., in time division duplexing (TDD) configurations, where the uplink and DL RF frequency are the same. In such scenarios, instead of offsetting the RF signal directly, the estimated Doppler shift can be compensated by applying a digital frequency offset as set forth in equation (12):

$$x(m) = x(m) * \exp\left(2\pi i * \hat{f}_d * \frac{m}{F_s}\right), \tag{12}$$

where m=0, 1, . . . is the time-domain IQ index, and $F_s$ is the IQs sampling rate.

Turning to additional considerations, in multipath scenarios, a channel usually contains multiple paths, or delays, whereby each channel experiences a different Doppler shift. The technology described herein is generally able to correct the main or average Doppler coefficient of all the different paths. Further, the technology described herein can significantly improve and reduce the intercarrier interference in many multipath scenarios, where there is one strong path, such as in line-of-sight situations.

Another consideration is that low SNR scenarios can occur, in that as the UE is getting closer to the connected cell, the DL signal from neighbor cells becomes weaker in comparison. Therefore, without planning for the SNR of the synchronization signals from the neighbor cells, the SNR may degrade to unworkable levels, in the case where the two cells share the same frequency resource. Scheduling can address this issue, such that SSB beams covering the same geographical area from all cells in the vicinity should have different time or frequency configurations (these configurations are already supported in the 5G standard). Further, each cell should refrain from allocating any DL signal on the given neighbor cell's synchronization channel resources (frequency) each T seconds.

Still further, the UE can be standardized to use the frequency estimation of neighbor cells only if the SNR is above a given threshold value. The UE can keep searching for those values over long windows of time, or alternatively, the UE can be notified of the search windows of neighbor synchronization channels for Doppler estimation purposes. A general goal is to find an optimal tradeoff between a required update frequency and loss of DL throughput, which depends on specific cell scenarios (e.g., high speed train/highway). By way of example, consider that if T=1 second, the UE gets one opportunity to update its Doppler shift every one second. This is likely a sufficient update frequency, because it is not expected that the UE's speed would change much in that timeframe.

Assuming three neighbor cells and a 40 MHz bandwidth, 5G SSB signal for each, there is a restriction of not using the following resources: 3 cells×4 symbols×20 RBs per second=240 RBs. Compared to the total DL resource (assuming FDD and SCS=30 kHz), 2000 slots*14 symbols*106 RBs=2968000. Therefore, the impact would be a DL throughput reduction of 240/2968000≈0.008%, which is negligible.

Yet another consideration is different cell frequencies; cells often reuse the same frequency. However, even in that case, the synchronization channels can be on different parts of the bandwidth, whereby the detected DL frequency from each cell can be different. This may appear as a problem but is not, because the technology described herein is actually estimating the shift of DL RF frequency compared to a grid (the global synchronization channel number (GSCN) in the case of 5G SSB), and therefore the absolute value is of no importance. In the case where the carrier DL frequency of the neighbor cells is different but not so far (same band), the impact is still negligible.

Figure 6:
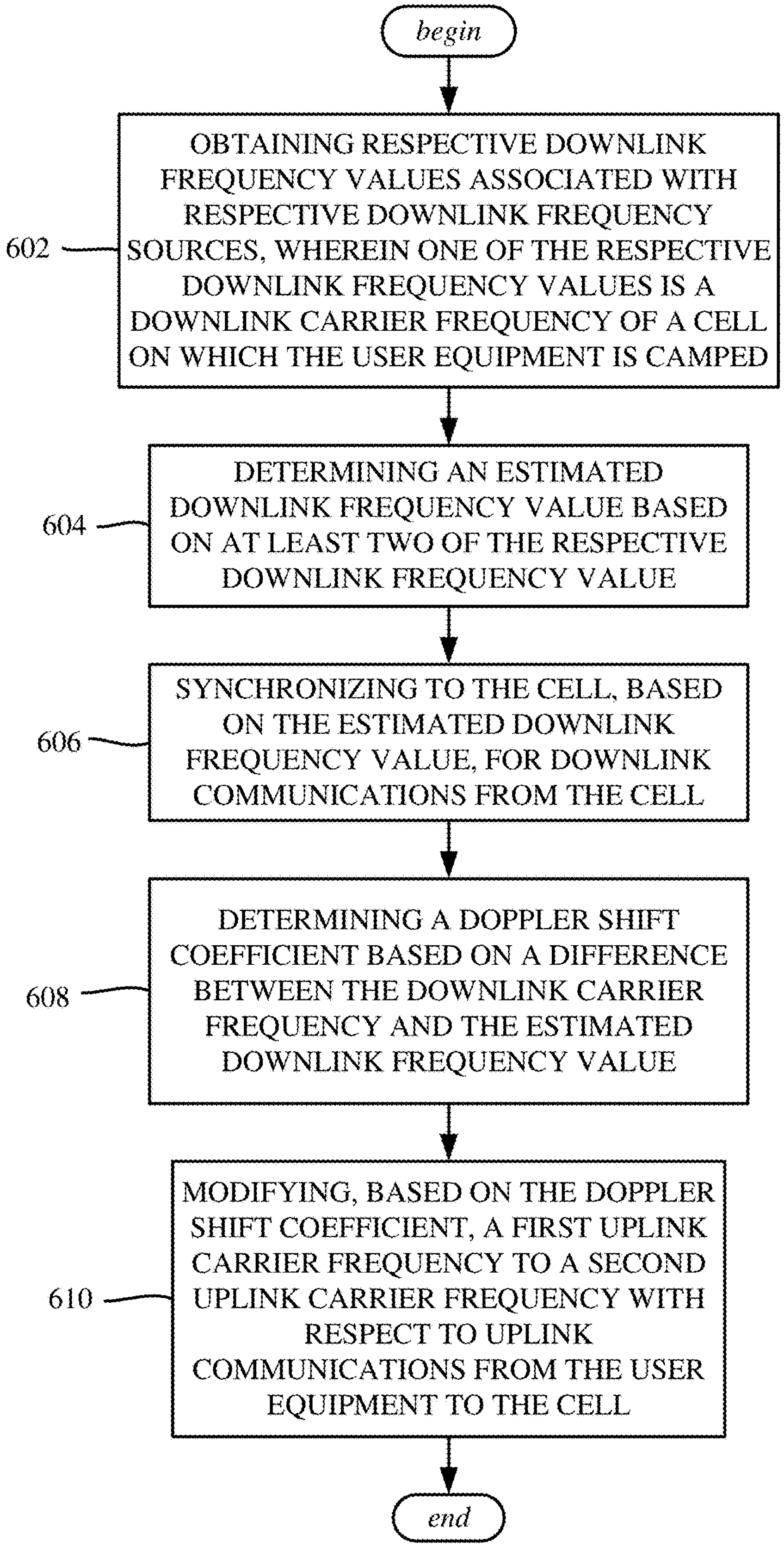
FIG. 6 is a flow diagram showing example operations related to obtaining downlink frequency values associated with downlink frequency sources and using those frequency values to determine a Doppler shift coefficient for modifying the uplink carrier frequency of a user equipment, in accordance with various implementations and embodiments of the subject disclosure.

One or more implementations and embodiments can be embodied in a user equipment, such as represented in the example operations of FIG. 6, and for example can include a memory that stores computer executable components and/or operations, and at least one processor that executes computer executable components and/or operations stored in the memory. Example operations can include operation 602, which represents obtaining respective downlink frequency values associated with respective downlink frequency sources, wherein one of the respective downlink frequency values is a downlink carrier frequency of a cell on which the user equipment is camped. Example operation 604 represents determining an estimated downlink frequency value based on at least two of the respective downlink frequency values. Example operation 606 represents synchronizing to the cell, based on the estimated downlink frequency value, for downlink communications from the cell. Example operation 608 represents determining a Doppler shift coefficient based on a difference between the downlink carrier frequency and the estimated downlink frequency value. Example operation 610 represents modifying, based on the Doppler shift coefficient, a first uplink carrier frequency to a second uplink carrier frequency with respect to uplink communications from the user equipment to the cell.

Determining the estimated downlink frequency value can include averaging the respective downlink frequency values.

Determining the estimated downlink frequency value can include determining respective estimated downlink frequency values for the respective downlink frequency values, selecting a highest estimated downlink frequency value from the respective estimated downlink frequency values, selecting a lowest estimated downlink frequency value from the respective estimated downlink frequency values, and averaging the highest estimated downlink frequency value and the lowest estimated downlink frequency value.

Further operations can include obtaining respective signal-to-noise values associated with the respective downlink frequency values, and determining a group of respective candidate downlink frequency values from the respective downlink frequency values based on selecting, as the group of respective candidate downlink frequency values, the respective downlink frequency values having associated respective signal-to-noise values that satisfy a defined threshold signal-to-noise ratio value; determining the estimated downlink frequency value can include determining respective estimated candidate downlink frequency values for the respective candidate downlink frequency values, selecting a highest estimated candidate downlink frequency value from the respective estimated candidate downlink frequency values, selecting a lowest estimated downlink frequency value from the respective estimated downlink candidate frequency values, and averaging the highest estimated downlink frequency value and the lowest estimated downlink frequency value.

A first one of the respective downlink frequency sources can include a first beam, and a second one of the respective downlink frequency sources can include a second beam that is different from the first beam.

A first one of the respective downlink frequency sources can include a first beam of the cell, and a second one of the respective downlink frequency sources can include a second beam of the cell that is different from the first beam.

The cell on which the user equipment is camped can include a first cell, and one of the respective downlink frequency sources can include a second cell that is different from the first cell.

Modifying the uplink carrier frequency can include determining an uplink carrier frequency offset based on the Doppler shift coefficient, and applying a direct shift to the first uplink carrier frequency, based on the uplink carrier frequency offset, to determine the second frequency value.

Modifying the uplink carrier frequency can include applying a digital uplink carrier frequency offset based on the Doppler shift coefficient to digitally modify time domain uplink IQ indexes, where I represents in-phase signal amplitude, and Q represents quadrature signal amplitude.

Further operations can include obtaining information that limits available downlink frequency sources to a subgroup of neighbor cells from which the user equipment obtains the respective downlink frequency values.

Figure 8:
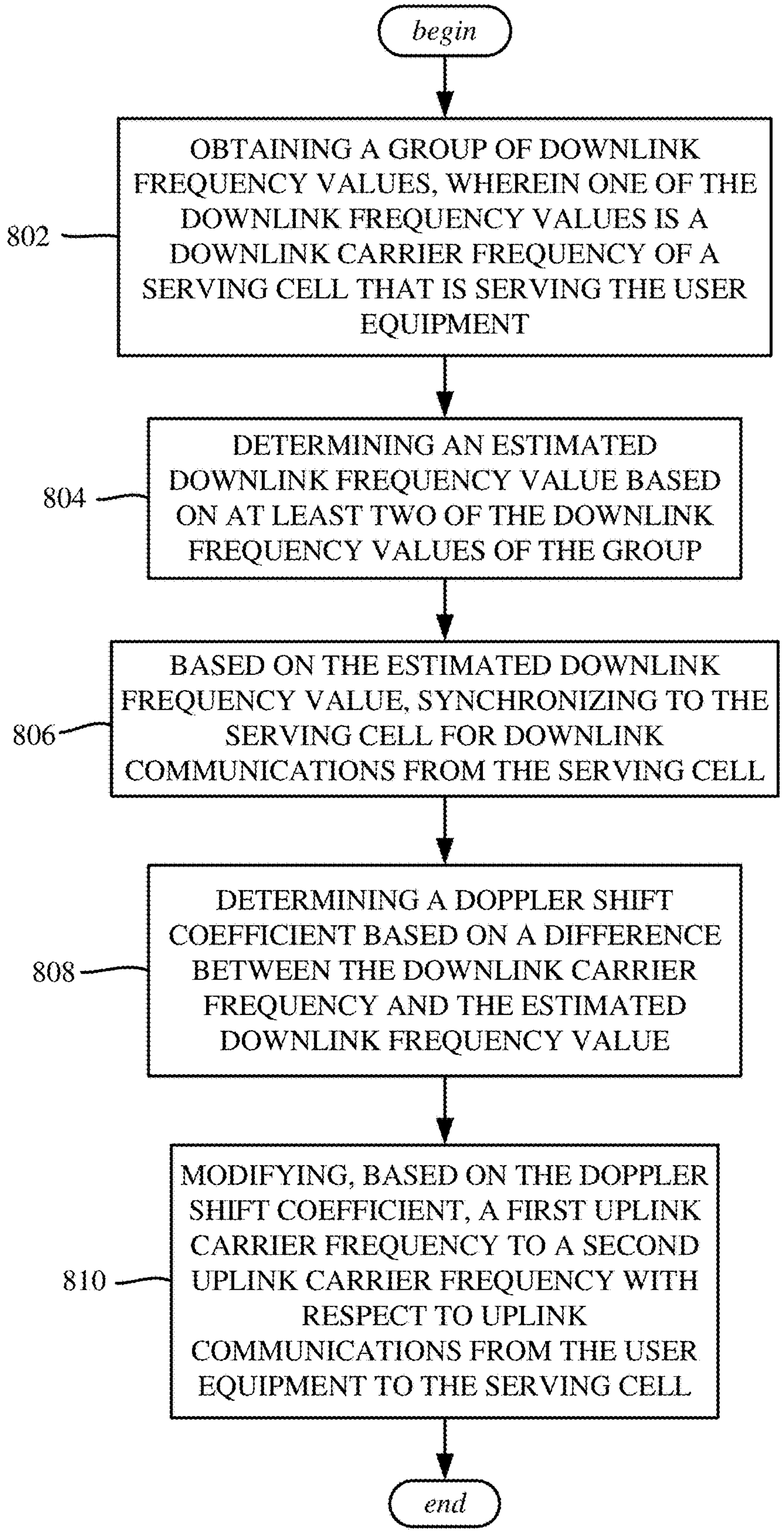
FIG. 8 is a flow diagram showing example operations related to modifying a first uplink carrier frequency to a second uplink carrier frequency of a user equipment based on a Doppler shift coefficient determined from multiple downlink frequencies of multiple sources, in accordance with various implementations and embodiments of the subject disclosure.

One or more example implementations and embodiments, such as corresponding to example operations of a method, are represented in FIG. 8. Example operation 802 represents camping, by user equipment comprising at least one processor, on a serving cell associated with a serving cell downlink carrier frequency. Example operation 804 represents obtaining, by the user equipment, respective downlink frequency values associated with respective downlink frequency sources, wherein one of the respective downlink frequency values is the serving cell downlink carrier frequency. Example operation 806 represents determining an estimated downlink frequency value based on aggregating at least two of the respective downlink frequency values. Example operation 808 represents synchronizing, to the serving cell by the user equipment, based on the estimated downlink frequency value, to remove a downlink frequency offset value based on a difference between a serving cell clock and a user equipment clock. Example operation 810 represents determining, by the user equipment, a Doppler shift coefficient based on a difference between the downlink carrier frequency and the estimated downlink frequency value. Example operation 812 represents modifying, by the user equipment based on the Doppler shift coefficient, a first uplink carrier frequency to a second uplink carrier frequency with respect to uplink communications from the user equipment to the serving cell.

Further operations can include obtaining, by the user equipment, respective signal-to-noise values associated with the respective downlink frequency values, and determining, by the user equipment, a candidate group of downlink frequency values from the respective downlink frequency values based on which of the respective downlink frequency values have associated respective signal-to-noise values that satisfy a defined threshold signal-to-noise ratio value, and wherein the aggregating of the at least two of the respective downlink frequency values can include selecting the at least two of the downlink frequency values from the candidate group.

Determining the estimated downlink frequency value can include determining respective candidate estimated downlink frequency values based on the respective downlink frequency values of the candidate group, and averaging a highest estimated downlink frequency value obtained from the respective candidate estimated downlink frequency values with a lowest estimated downlink frequency value obtained from the respective candidate estimated downlink frequency values.

Modifying the uplink carrier frequency can include determining an uplink carrier frequency offset based on the Doppler shift coefficient, and applying a direct shift to the first uplink carrier frequency, based on the uplink carrier frequency offset, to determine the second uplink carrier frequency.

Modifying the uplink carrier frequency can include applying a digital uplink carrier frequency offset based on the Doppler shift coefficient to digitally modify time domain uplink IQ indexes, where I represents in-phase signal amplitude, and Q represents quadrature signal amplitude.

Further operations can include receiving, by the user equipment, cell selection information, and selecting the respective downlink frequency sources based on the cell selection information.

FIG. 8 summarizes various example operations, e.g., corresponding to a machine-readable medium, comprising executable instructions that, when executed by at least one processor of user equipment, facilitate performance of operations. Example operation 802 represents obtaining a group of downlink frequency values, wherein one of the downlink frequency values is a downlink carrier frequency of a serving cell that is serving the user equipment. Example operation 804 represents determining an estimated downlink frequency value based on at least two of the downlink frequency values of the group. Example operation 806 represents based on the estimated downlink frequency value, synchronizing to the serving cell for downlink communications from the serving cell. Example operation 808 represents determining a Doppler shift coefficient based on a difference between the downlink carrier frequency and the estimated downlink frequency value. Example operation 810 represents modifying, based on the Doppler shift coefficient, a first uplink carrier frequency to a second uplink carrier frequency with respect to uplink communications from the user equipment to the serving cell.

Further operations can include obtaining respective signal-to-noise ratio values associated with respective downlink frequency values of the group, determining a candidate group of downlink frequency values from the respective downlink frequency values based on which of the respective downlink frequency values of the group have associated respective signal-to-noise values that satisfy a defined threshold signal-to-noise ratio value, and selecting the at least two of the downlink frequency values from the candidate group for the determining of the estimated frequency value.

Determining the estimated downlink frequency value can include determining respective estimated downlink frequency values based on the respective frequency values of the candidate group, and averaging a highest estimated downlink frequency value from among the respective estimated frequency values with a lowest estimated downlink frequency value from among the respective estimated downlink frequency values.

Modifying the uplink carrier frequency can include at least one of: applying a digital uplink carrier frequency offset based on the Doppler shift coefficient to digitally modify time domain uplink IQ indexes, where I represents in-phase signal amplitude and Q represents quadrature signal amplitude, or determining an uplink carrier frequency offset shift value based on the Doppler shift coefficient, and applying a direct shift to the first uplink carrier frequency, based on the uplink carrier frequency shift value, to determine the second uplink carrier frequency.

As can be seen, the technology described herein facilitates mitigating the Doppler shift on the uplink carrier frequency. Benefits include increasing UL spectral efficiency by reducing intracell interferences.

Turning to general concepts, as used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

A wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mm Wave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms of the number of transmit (M) and the number of receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 9:
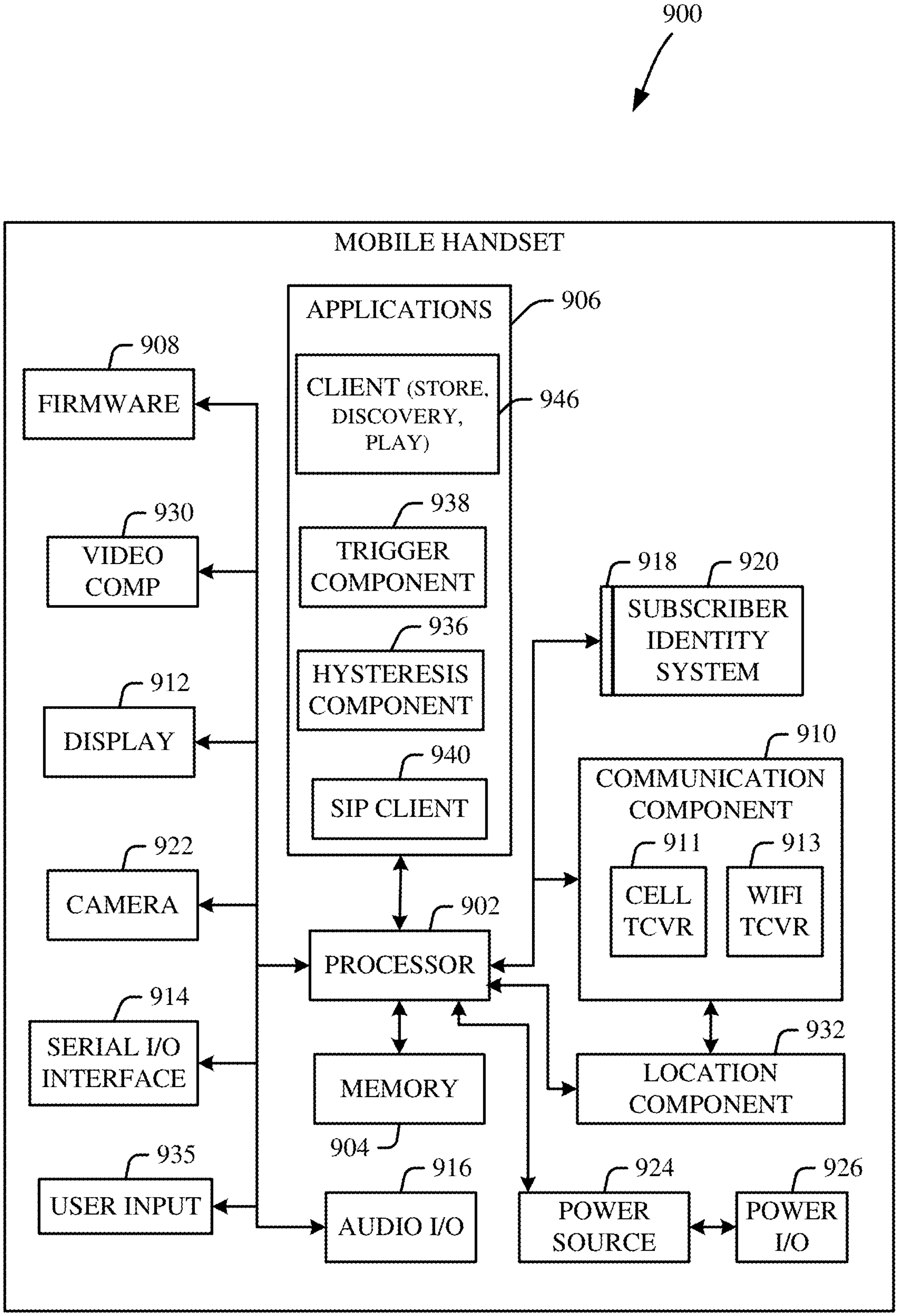
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 and/or the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
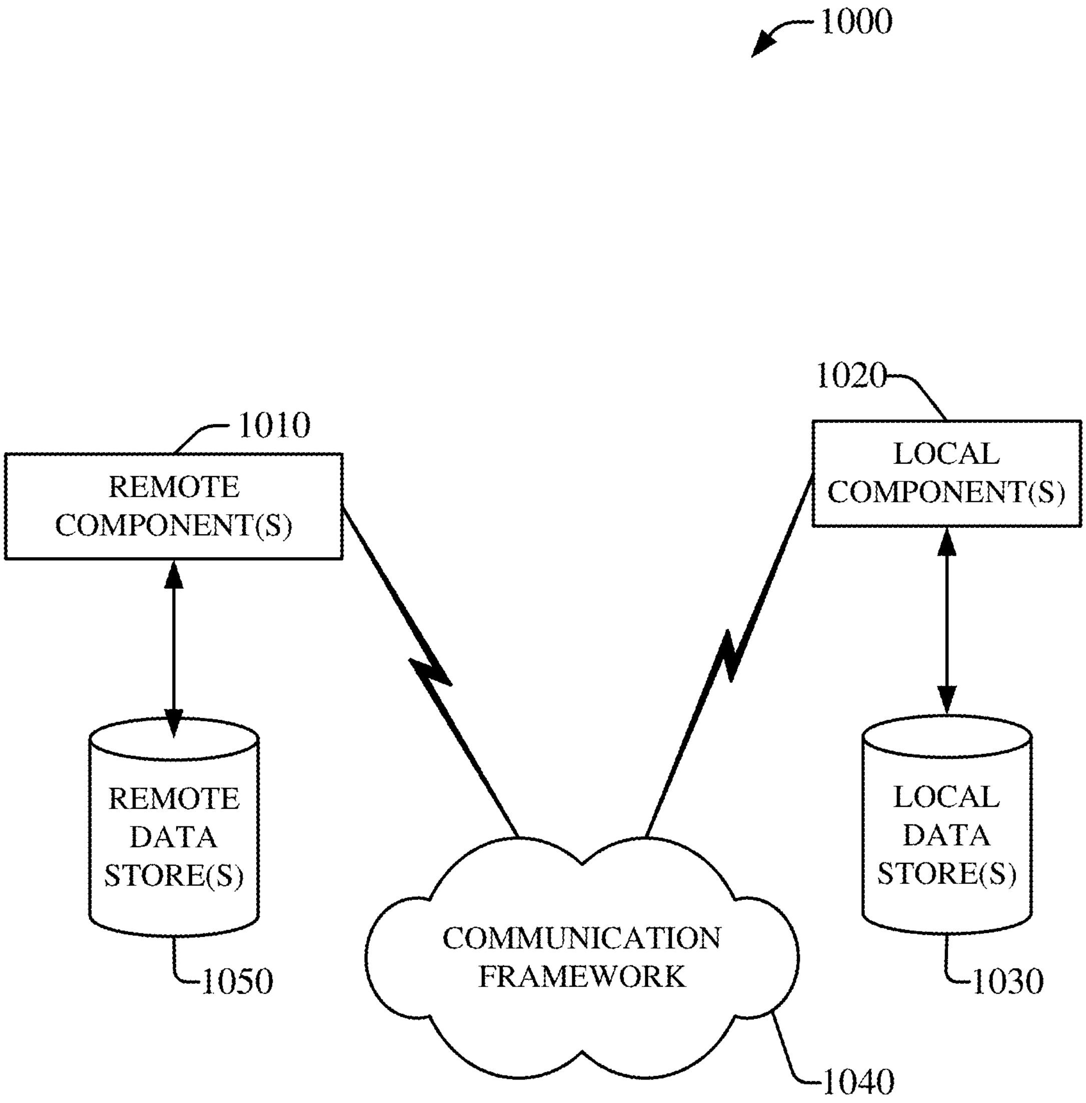
FIG. 10 is a block diagram representing an example computing environment into which the subject matter described herein may be incorporated and/or may communicate.

FIG. 10 is a schematic block diagram of a computing environment 1000 with which the disclosed subject matter can interact. The system 1000 can include one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
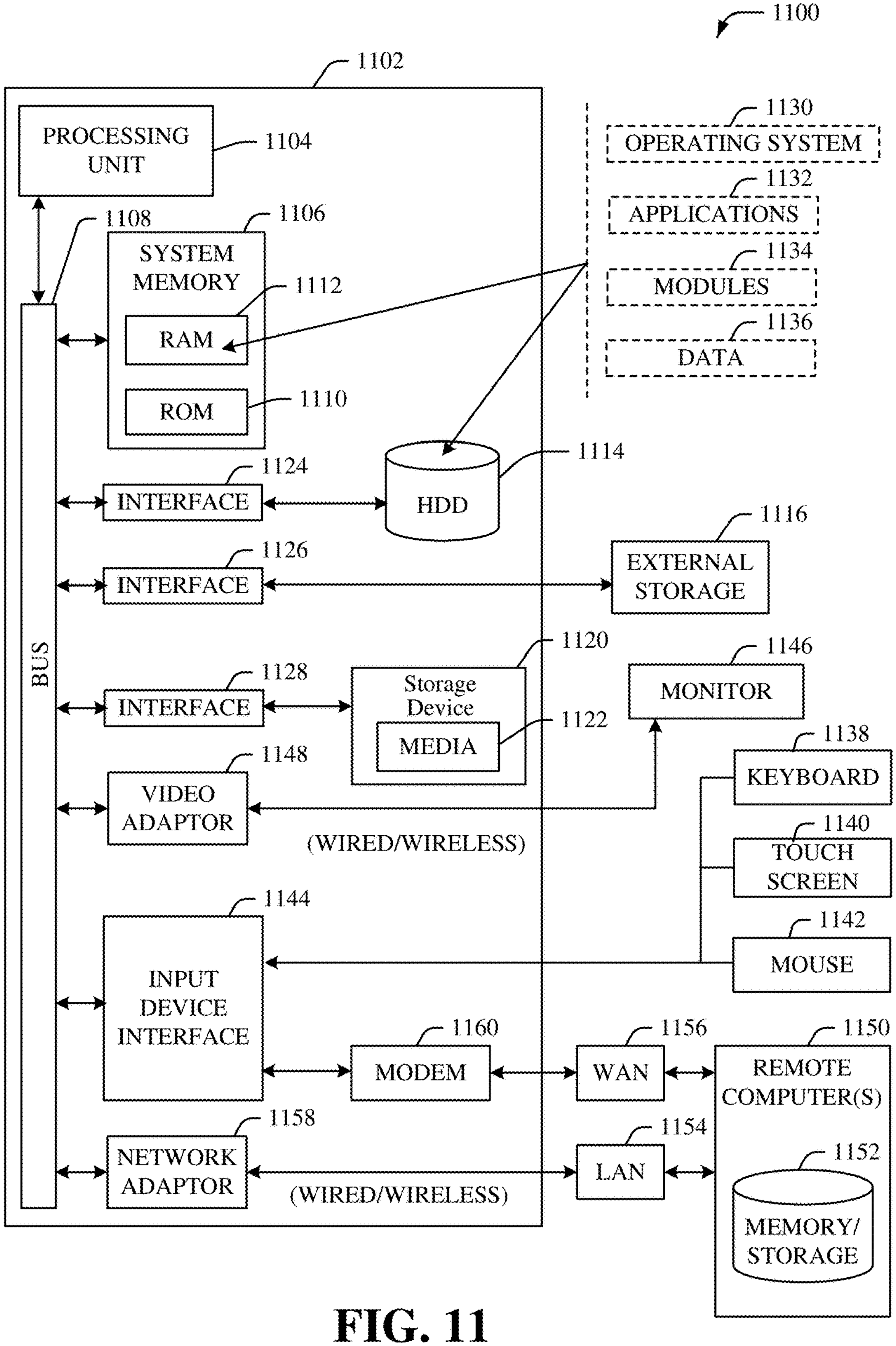
FIG. 11 depicts an example schematic block diagram of a computing environment with which the disclosed subject matter can interact/be implemented at least in part, in accordance with various implementations and embodiments of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various implementations and embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A user equipment, comprising:

at least one processor; and a memory that stores executable instructions that, when executed by the processor, facilitate performance of operations, the operations comprising:

obtaining respective downlink frequency values associated with respective downlink frequency sources, wherein one of the respective downlink frequency values is a downlink carrier frequency of a cell on which the user equipment is camped;

determining an estimated downlink frequency value based on at least two of the respective downlink frequency values, wherein the determining of the estimated downlink frequency value comprises averaging the respective downlink frequency values;

synchronizing to the cell, based on the estimated downlink frequency value, for downlink communications from the cell;

determining a Doppler shift coefficient based on a difference between the downlink carrier frequency and the estimated downlink frequency value; and modifying, based on the Doppler shift coefficient, a first uplink carrier frequency to a second uplink carrier frequency with respect to uplink communications from the user equipment to the cell.

2. The user equipment of claim 1, wherein the determining of the estimated downlink frequency value further comprises determining respective estimated downlink frequency values for the respective downlink frequency values, selecting a highest estimated downlink frequency value from the respective estimated downlink frequency values, selecting a lowest estimated downlink frequency value from the respective estimated downlink frequency values, and wherein the averaging comprises averaging the highest estimated downlink frequency value and the lowest estimated downlink frequency value.

3. The user equipment of claim 1, wherein the operations further comprise:

obtaining respective signal-to-noise values associated with the respective downlink frequency values; and determining a group of respective candidate downlink frequency values from the respective downlink frequency values based on selecting, as the group of respective candidate downlink frequency values, the respective downlink frequency values having associated respective signal-to-noise values that satisfy a defined threshold signal-to-noise ratio value, wherein the determining of the estimated downlink frequency value further comprises determining respective estimated candidate downlink frequency values for the respective candidate downlink frequency values, selecting a highest estimated candidate downlink frequency value from the respective estimated candidate downlink frequency values, selecting a lowest estimated downlink frequency value from the respective estimated downlink candidate frequency values, and wherein the averaging comprises averaging the highest estimated downlink frequency value and the lowest estimated downlink frequency value.

4. The user equipment of claim 1, wherein a first one of the respective downlink frequency sources comprises a first beam, and wherein a second one of the respective downlink frequency sources comprises a second beam that is different from the first beam.

5. The user equipment of claim 1, wherein a first one of the respective downlink frequency sources comprises a first beam of the cell, and wherein a second one of the respective downlink frequency sources comprises a second beam of the cell that is different from the first beam.

6. The user equipment of claim 1, wherein the cell on which the user equipment is camped comprises a first cell, and wherein one of the respective downlink frequency sources comprises a second cell that is different from the first cell.

7. The user equipment of claim 1, wherein the modifying of the first uplink carrier frequency comprises determining an uplink carrier frequency offset based on the Doppler shift coefficient, and applying a direct shift to the first uplink carrier frequency, based on the uplink carrier frequency offset, to determine the second frequency value.

8. The user equipment of claim 1, wherein the modifying of the first uplink carrier frequency comprises applying a digital uplink carrier frequency offset based on the Doppler shift coefficient to digitally modify time domain uplink IQ indexes, where I represents in-phase signal amplitude, and Q represents quadrature signal amplitude.

9. The user equipment of claim 1, wherein the operations further comprise obtaining information that limits available downlink frequency sources to a subgroup of neighbor cells from which the user equipment obtains the respective downlink frequency values.

10. A method, comprising:

camping, by a user equipment comprising at least one processor, on a serving cell associated with a serving cell downlink carrier frequency;

obtaining, by the user equipment, respective downlink frequency values associated with respective downlink frequency sources, wherein one of the respective downlink frequency values is the serving cell downlink carrier frequency;

determining an estimated downlink frequency value based on at least two of the respective downlink frequency values, wherein the determining of the estimated downlink frequency value comprises averaging the respective downlink frequency values;

synchronizing, to the serving cell by the user equipment, based on the estimated downlink frequency value, to remove a downlink frequency offset value based on a difference between a serving cell clock and a user equipment clock;

determining, by the user equipment, a Doppler shift coefficient based on a difference between the downlink carrier frequency and the estimated downlink frequency value; and modifying, by the user equipment based on the Doppler shift coefficient, a first uplink carrier frequency to a second uplink carrier frequency with respect to uplink communications from the user equipment to the serving cell.

11. The method of claim 10, further comprising obtaining, by the user equipment, respective signal-to-noise values associated with the respective downlink frequency values, and determining, by the user equipment, a candidate group of downlink frequency values from the respective downlink frequency values based on which of the respective downlink frequency values have associated respective signal-to-noise values that satisfy a defined threshold signal-to-noise ratio value, and wherein the averaging aggregating of the at least two of the respective downlink frequency values comprises selecting the at least two of the downlink frequency values from the candidate group.

12. The method of claim 11, wherein the determining of the estimated downlink frequency value further comprises determining respective candidate estimated downlink frequency values based on the respective downlink frequency values of the candidate group, and wherein the averaging comprises averaging a highest estimated downlink frequency value obtained from the respective candidate estimated downlink frequency values with a lowest estimated downlink frequency value obtained from the respective candidate estimated downlink frequency values.

13. The method of claim 10, wherein the modifying of the first uplink carrier frequency comprises determining an uplink carrier frequency offset based on the Doppler shift coefficient, and applying a direct shift to the first uplink carrier frequency, based on the uplink carrier frequency offset, to determine the second uplink carrier frequency.

14. The method of claim 10, wherein the modifying of the first uplink carrier frequency comprises applying a digital uplink carrier frequency offset based on the Doppler shift coefficient to digitally modify time domain uplink IQ indexes, where I represents in-phase signal amplitude, and Q represents quadrature signal amplitude.

15. The method of claim 10, further comprising receiving, by the user equipment, cell selection information, and selecting the respective downlink frequency sources based on the cell selection information.

16. A non-transitory machine-readable medium, comprising executable instructions that, when executed by at least one processor of a user equipment, facilitate performance of operations, the operations comprising:

obtaining a group of downlink frequency values, wherein one of the downlink frequency values is a downlink carrier frequency of a serving cell that is serving the user equipment;

determining an estimated downlink frequency value based on at least two of the downlink frequency values of the group, wherein the determining of the estimated downlink frequency value comprises averaging the downlink frequency values;

based on the estimated downlink frequency value, synchronizing to the serving cell for downlink communications from the serving cell;

determining a Doppler shift coefficient based on a difference between the downlink carrier frequency and the estimated downlink frequency value; and modifying, based on the Doppler shift coefficient, a first uplink carrier frequency to a second uplink carrier frequency with respect to uplink communications from the user equipment to the serving cell.

17. The non-transitory machine-readable medium of claim 16, wherein the operations further comprise obtaining respective signal-to-noise ratio values associated with respective downlink frequency values of the group, determining a candidate group of downlink frequency values from the respective downlink frequency values based on which of the respective downlink frequency values of the group have associated respective signal-to-noise values that satisfy a defined threshold signal-to-noise ratio value, and selecting the at least two of the downlink frequency values from the candidate group for the determining of the estimated frequency value.

18. The non-transitory machine-readable medium of claim 17, wherein the determining of the estimated downlink frequency value further comprises determining respective estimated downlink frequency values based on the respective frequency values of the candidate group, and wherein the averaging comprises averaging a highest estimated downlink frequency value from among the respective estimated frequency values with a lowest estimated downlink frequency value from among the respective estimated downlink frequency values.

19. The non-transitory machine-readable medium of claim 16, wherein the modifying of the first uplink carrier frequency comprises at least one of: applying a digital uplink carrier frequency offset based on the Doppler shift coefficient to digitally modify time domain uplink IQ indexes, where I represents in-phase signal amplitude and Q represents quadrature signal amplitude, or determining an uplink carrier frequency offset shift value based on the Doppler shift coefficient, and applying a direct shift to the first uplink carrier frequency, based on the uplink carrier frequency shift value, to determine the second uplink carrier frequency.

20. The method of claim 10, wherein a first one of the respective downlink frequency sources comprises a first beam of the serving cell, and wherein a second one of the respective downlink frequency sources comprises a second beam of the serving cell that is different from the first beam.

* * * * *